United States Patent [19]

Anger

[11] Patent Number: 4,712,893
[45] Date of Patent: Dec. 15, 1987

[54] TEMPLE END PIECE FOR A TEMPLE OF A SPECTACLE FRAME

[76] Inventor: Wilhelm Anger, Chesa Pas-Chura, 7500 St. Moritz-Suvretta, Switzerland

[21] Appl. No.: 807,527

[22] Filed: Dec. 10, 1985

[30] Foreign Application Priority Data

Jul. 12, 1985 [DE] Fed. Rep. of Germany ....... 3525006

[51] Int. Cl.⁴ ............................................. G02C 5/14
[52] U.S. Cl. ................................................. 351/123
[58] Field of Search ...................... 351/123, 156, 157; 2/448

[56] References Cited

U.S. PATENT DOCUMENTS

| 460,576 | 10/1891 | Halbe | 351/123 |
| 4,389,102 | 6/1983 | Piampiano | 351/123 |

FOREIGN PATENT DOCUMENTS 186003 9/1922 United Kingdom ................ 351/123

Primary Examiner—Rodney B. Bovernick

[57] ABSTRACT

A temple end piece for a temple of a spectacle frame comprises an essentially straight first segment extending in the longitudinal direction of the temple, a connecting segment extending downward from the first segment, and a fitting segment intended for resting against the head and/or behind the ear. The elongated fitting segment is borne by the connecting segment and supported by it, whereby this support is accomplished at the longitudinal middle or on the lower end or in the region between the longitudinal middle and the lower end of the fitting segment, so that at least the upper half of the fitting segment protrudes upward to the first segment and can be deflected elastically in the direction toward the connecting segment. The upper end of the fitting segment is connected to the first segment or the connecting segment with the aid of a flexible, elongated element 20, which element will be sufficiently pliable in order to permit of the deflection movement in sufficient measure, but simultaneously to form a bridge between the upper end of the fitting segment and the first segment and/or connecting segment, so that the upper end can formed no hook-like tip and at the same time no hair or similar objects between the first segment and the fitting segment can reach into the space bordered by the fitting segment and connecting segment.

14 Claims, 13 Drawing Figures

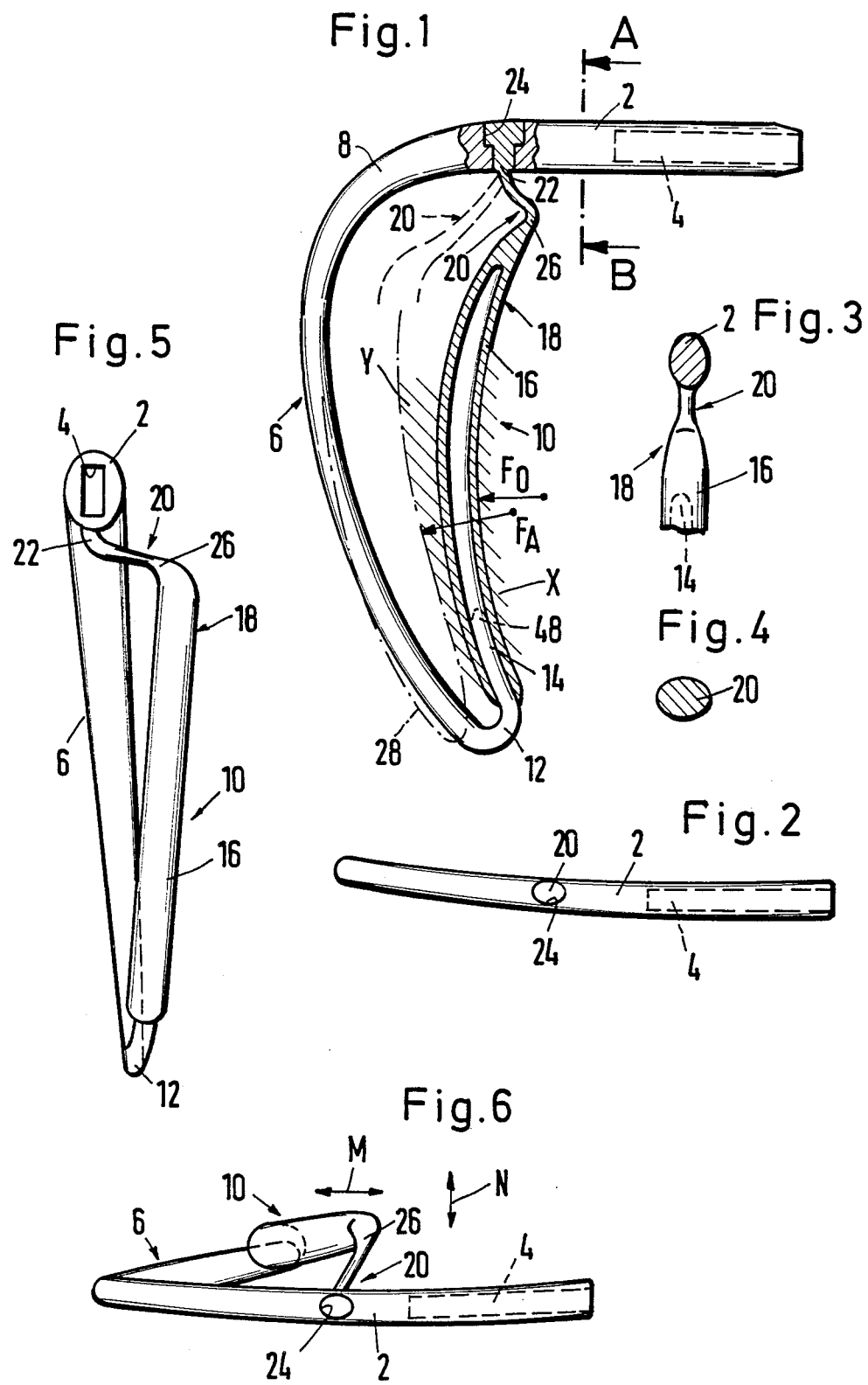

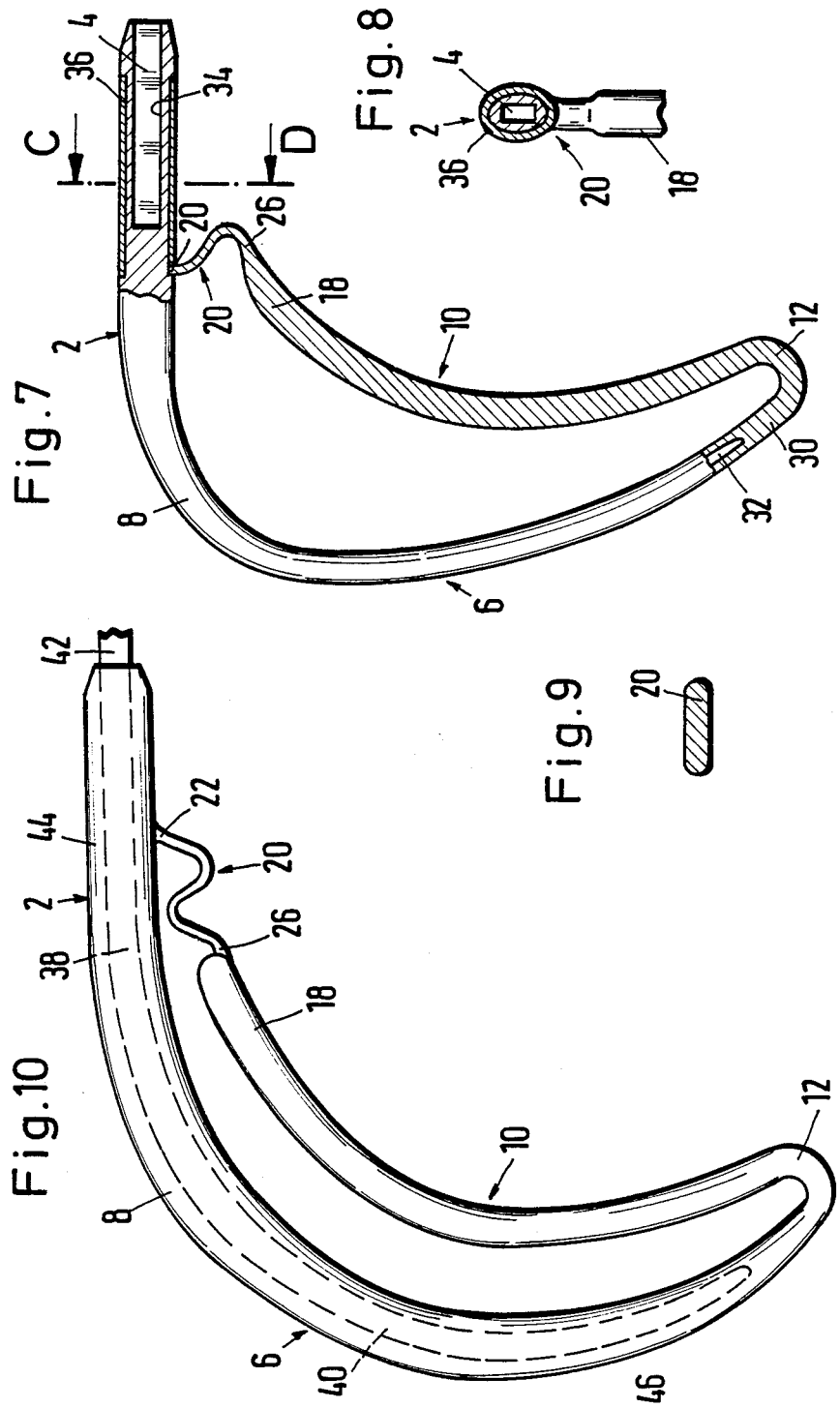

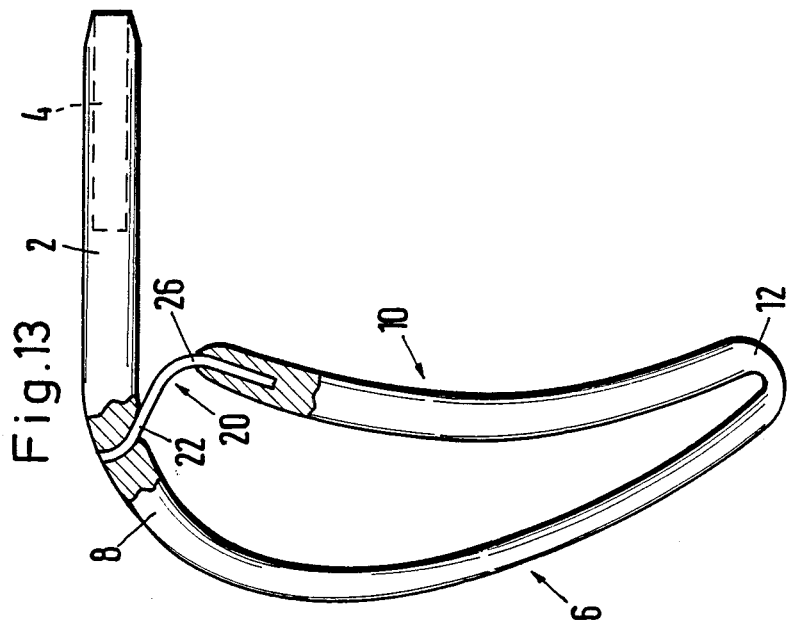
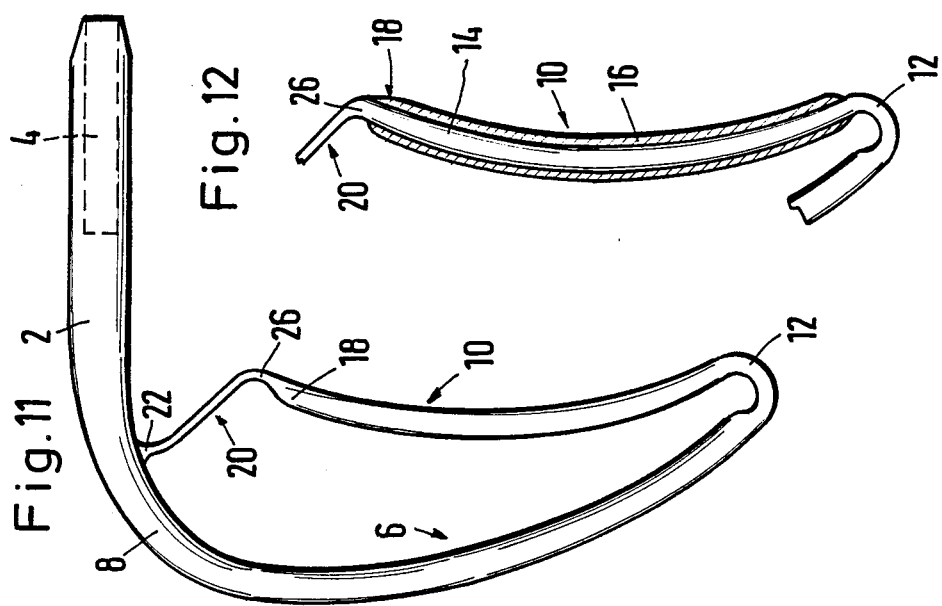

TEMPLE END PIECE FOR A TEMPLE OF A SPECTACLE FRAME

FIELD OF THE INVENTION

The present invention relates to a temple end piece for a temple of a spectacle frame.

PRIOR ART

Such a temple end piece is shown in my co-pending application U.S. Ser. No. 661, 224 now U.S. Pat. No. 4,652,098 filed Oct. 15, 1984. In this temple end piece the fittng segment (called a design segment in my prior application) is supported in its middle region or below the latter on the remainder of the temple end piece and thus at the temple. At least the upper half of the fitting segment protrudes freely upward. This geometry of the temple end piece causes the fitting segment to be held diagonally below and behind and for forces to be exercised by it also to be possibly directed diagonally upward and forward and for deflection movements of the fitting segment caused by forces directed backward as arise from the inner elasticity of the material of the temple end piece or intentionally made possible by springy elements provided for in the temple end piece and exercised of the fitting segment to shift most sharply the upper, free-standing end of the fitting segment (by comparison to the remaining regions of the fitting segment) or at least shift it sharply. This means that the restoring force caused by the deflection and exercised by the fitting segment and acting as a reaction force on the latter performs its action at all the more favorable an angle the stronger the deflection is. The angle will be all the more favorable the less the reaction component directed vertically upward is that acts on the temple end piece. This gets to be all the less with the same amount of reaction force the farther the upper end of the fitting segment is deflected to the rear.

The known configuration described here, i.e. the pattern of the temple end piece caused by this in the instance of an elastic deformation, thus has the consequence that the spectacle frame or the spectacles to which such a temple end piece belongs will be pulled backward by the temple end pieces in the event the spectacles are shifted, but without the backward motion's being superimposed with any notable upward shifting of the temple end pieces.

The spectacle will thus easily return to its original position, so that the spectacle wearer will need less often to correct the position of the spectacles. This is accomplished by the special manner of the support of the fitting segment on the remainder of the temple end piece, whereby the fitting segment can be shaped so massively and rigidly that it does not need to be threaded laboriously behind the ear—as in the case of wire frames. The fitting segment of the temple end piece can thus be designed in such a manner that it will rest either on the head or behind the ear or simultaneously on the head and behind the ear. Preferably, however, it will rest essentially at the rear behind the auricle, specifically in the vicinity of the furrow or groove between the auricle and the skull. It is important for this temple end piece known in the art for the fitting segment to be held and guided in such a manner that when a deflection of the fitting segment occurs, the deflection movement does not cause a deterioration in the power action of the fitting segment on the head and/or ear. The geometry of the elements of the temple end piece and the distribution of the elastic properties onto the elements of the temple end piece have been adapted to this purpose. This mounting support and conduct of the fitting segment makes it simultaneously possible for the fitting segment to be aligned easily into the proper position when the spectacles are in place and thus for concentrations of pressure to be avoided. For this purpose it is also appropriate that to deflect the upper end of the fitting segment by a certain amount only the slightest degree of force is required, which causes the fact that precisely that region of the fitting segment which must absorb if necessary the portion of the weight of the spectacles to be supported by the attached temple will have a great amount of flexibility or the greatest amount of flexibility and can thus be readily placed into the best position possible.

Although this temple end piece known in the art already has very favorable properties, certain disadvantages have also been demonstrated, specifically in putting on and taking off the spectacles. Both the arrangement of the temple end pieces behind the ears when the spectacles are put on and the forward pull of the temple end pieces from the region behind the ears when the spectacles are removed requires somewhat more attention and effort on the part of the spectacle wearer than is the case, for example, with spectacles having so-called golf temples.

It thus becomes a matter of improving the east of handling spectacles having these known temple end pieces.

OBJECTION OF THE INVENTION

This invention is based on the objective of designing the temple end piece in this category in such a manner that it will be situated more comfortably behind the ear when the spectacles are put on and can be removed from the region behind the ear in a simpler manner when the spectacles are taken off.

SUMMARY AND ADVANTAGES OF THE INVENTION

In the temple end piece in accordance with the present invention care has been taken for the first segment to guide the upper end of the fitting segment in a certain range by virtue of the connection created by the flexible element between the upper end and the first segment, but without, however, preventing the deflection motion of the fitting segment. The fitting segment can thus carry out as previously the desirable deflection movement as described in detail in the above, in which movement the power action of the fitting segment on the head and/or the ear is at least not detracted from; at the same time, however, the flexible element limits the extent of the movement of the upper end of the fitting segment relative to the first segment, so that the fitting segment during the putting on and taking off of the spectacles is partially guided by the first segment. This makes it easier to put the spectacles on and to take them off.

A further favorable property deriving from the design of the temple end piece in accordance with the present invention consists of the fact that, because of the connection between the upper end of the fitting segment and the first segment, the delineation of the area defined by the first segment, the connecting segment and the fitting segment is closed. This has the practical advantage that no object can get into the delineated area between the upper end of the fitting segment and the first segment, particularly no strands of hair, which could get caught in the transition area between the connection segment and the fitting segment and thus impede the removal of the spectacles especially. This means in other words that the hook-shaped form of the various embodiments of the temple end piece belonging to the state of the art, in which the upper end of the end region of the fitting segment forms a free-standing hooked tip is avoided in the temple end piece in accordance with the present invention and is replaced and/or further developed with a loop-shaped form.

The mechanically carrying connection between the fitting segment and the remainder of the temple end piece is constituted in the temple end piece in accordance with the present invention by the transition region between the connecting segment and the fitting segment. The essential deflection movement of the fitting segment, i.e. the deflection movement accomplished in the direction to the rear to the connecting segment, is essentially determined with respect to the elastic forces thus occurring and with respect to the respective positions assumed by the fitting segment under stress by the support of the fitting segment in the transition region and by the elastic properties of both the connecting segment and the fitting segment. This deflecting pattern should be affected as little as possible by the connection between the upper end of the fitting segment and the first segment such as is provided for in the temple end piece in accordance with the present invention. In any event the instance should not be excluded in which the flexible element can guide the fitting segment in its deflection movements; the flexible element, for example, can be designed in such a manner that it will be relatively inflexible vertically to the level formed by the first segment, the connecting segment and the fitting segment, so that is will pose greater resistance to the movements of the fitting segment vertical to the level stated.

The characteristic of the flexible element of the temple end piece in accordance with the present invention, to the degree that this element permits of a movement of its upper end relative to the first segment in at least the direction of deflection of the fitting segment, refers to the conditions that obtain for use intended use of the assigned spectacles. The forces arising at the fitting segment and temple end piece when the spectacles are put to their intended use should suffice, despite the presence of the flexible element, to deflect the fitting segment in the sense described in detail at the beginning. A flexible element which would not permit of such a movement of the fitting segment, but which would yield only with the appearance of greater forces and permit of a movement of the fitting segment, will not fulfill the requirements placed on the flexible element of the temple end piece. On the other hand, it is understood that the flexible element need not be without a certain resistance against the desired deflection movement; rather, it may pose the latter with a certain resistance, to the extent that the deflection movement is not essentially impeded.

Preferably a wire will be involved in this flexible element or a thin tape with a flat, rectangular profile. In addition, provision can be made in a preferred embodiment of the present invention for the flexible element to have such a length between its two ends that in the movement allowed by the element the interval between the first and the second end of the flexible element will be smaller than its length. This means in other words that the flexible element will have a certain excessive length in order for it to be able to deflect the fitting segment with increasing extensions of the flexible element.

The temple end piece in accordance with the present invention can be produced both as a separate component part and joined together after manufacture with the remainder of the temple, or be made simultaneously with the remainder of the temple, whereby in this case the remainder of the temple will transform directly into the first segment of the temple end piece or the first segment of the temple end piece will the back end piece of the shaft of the temple.

Additional advantages and characteristics of the present invention will be apparent from the following description of the preferred embodiments shown in the drawings, in which:

FIG. 1 is a side view of a preferred embodiment of a temple end piece, partially in section;

FIG. 2 is a top view of the temple end piece in accordance with FIG. 1;

FIG. 3 is a section drawing along A-B in FIG. 1;

FIG. 4 is an enlarged section drawing through the flexible element of the temple end piece in accordance with FIG. 1;

FIG. 5 is a front view of a second embodiment of a temple end piece;

FIG. 6 is a top view corresponding to FIG. 2 of the temple end piece according to FIG. 5;

FIG. 7 is a representation corresponding to FIG. 1 of a third embodiment;

FIG. 8 is a section drawing along C-D ion FIG. 7;

FIG. 9 is an enlarged drawing of the flexible element of the third embodiment;

FIG. 10 is a representation corresponding to FIG. 1 of a fourth embodiment;

FIG. 11 is a representation corresponding to FIG. 1 of a fifth embodiment;

FIG. 12 is a representation in section of a variant of the fifth embodiment; and FIG. 13 is a representation corresponding to FIG. 1 of a sixth embodiment.

In the following the preferred embodiment will be first described, this being with reference to FIGS. 1 through 4.

The temple end piece illustrated show a straight, elongated first segment 2, which can either be formed in one piece with a temple shaft (not shown) or—as in the instance depicted—is capable of being joined with the end of the temple shaft (not shown), for which purpose the first segment will have an insertion aperture 4. The first segment 2 has a rounded-off rectangular or oval profile, as may be seen in FIG. 3.

On the left or back end (as seen in FIG. 1) of the first segment 2 the latter is connected to the upper end of a connecting segment 6. The first segment and the connecting segment 6 are formed together with one another in one piece; these ends joined together form a first transition area 8. The first transition area 8 is curved in the shape of an arc and transforms gradually from the essentially horizontally extending first segment 2 into the essentially vertically extending connecting segment 6, which for its part is curved in the shape of an arc, whereby the inner side of the curvature faces to the right (as seen in FIG. 1). When the spectacles are worn in place this inner side of the curvature will face towards the ear.

At its lower end the connecting segment 6 is connected to the lower end of a fitting segment 10. These two ends form a second transition area 12. The fitting segment 10 has a core region 14 extending over the entire length of the fitting segment 10 and a cover region, or casing 16, which likewise extends over the entire length of the fitting segment and surrounds the core region 14 on all sides. The casing 16 consists of a softer material than that of the core region 14. The connecting segment 6 and the core region 14 of the fitting segment 10 are formed together in one piece. The transition area 12 is curved in the shape of an arc and transforms gradually from the more gently curving connecting segment 6 to the fitting segment 10 extending essentially vertically with respect to the first segment 2.

The fitting segment 10 is curved in the shape of an arc, as may be seen in FIG. 1, whereby the inner side of the curvature faces to the front toward the ear, i.e. to the right as seen in FIG. 1. The fitting segment 10 is intended for coming to rest on the head and/or the ear and by this means to support the back portion of the temple. This support of the back part of the temple end serves the purpose of introducing a part of the force of the weight of the spectacles into the head and in addition to secure the spectacles against being shifted to the front and sliding down the bridge of the nose. Preferably the fitting segment 10 will repose against the auricle from behind, specifically in the region of the furrow or ridge between the skull and the auricle. In the embodiment shown in the illustration the fitting segment 10, which is approximately as long as the connecting segment 6, has a circular profile (not shown) with a constant cross-section area over the entire length of the fitting segment 10. The strength and thickness of the fitting segment 10 and the material properties of the core region 14 and the casing 16 are suited to one another in such a manner that the fitting segment 10 becomes an elastic element in the manner of a leaf spring.

The cross-section profile (not shown) of the connecting segment 6 is circular or oval and has over the entire length of the connecting segment 6 approximately the same area, whereby, however, the connecting segment 6 tapers slightly at first, proceeding from its upper end. In addition, in the connecting segment 6 the dimensions and the material properties are suited with one another in such a manner that the connecting segment acts as an elastic element in the manner of a leaf or wire spring, whereby the leaf spring is more rigid than the leaf spring formed by the fitting segment 10. The connection formed by the transition region 8 between the first segment 2 and the connecting segment 6 is comparatively rigid.

The fitting segment 10 has an upper end 18. Between this upper end 18 of the fitting segment 10 and the first segment 2 an elongated, flexible element 20 has been placed which connects the end 18 with the first segment 2. The flexible element 20 has a first end 22 at the top (as seen in FIG. 1), which is fastened to the first segment 23. For this purpose a graduated borehole 24 is formed in the segment 2 in which the first end 22 is anchored in form and material lock. In the embodiment shown in the illustration this anchoring is effected in such a manner that in the injection molding of the first segment 2 by means of a suitable plastic material the graduated borehole 24 will be formed and that the plastic material forming the flexible element 20 is injected clear through this borehole during the formation of this element.

At its lower end as seen in FIG. 1 the element 20 has a second end 26 which is firmly connected to the upper end 18 of the fitting segment 10 by virtue of the fact that the flexible element 20 and the casing 16 are made in one piece out of the same plastic material and thus the end 26 of the flexible element 20 transforms directly into the upper end 18 of the fitting segment 10.

The flexible element 20 has the form of a wire, which, as shown in the enlarged representation of its cross section in Fig. 4, has a circular profile or approximately a circular profile. In the uncharged state as shown in FIG. 1 the first end 22 of the flexible element 20 is located approximately above the second end 26, whereby the element 20 is curved in an S-shape, so that the length of the flexible element 20 is larger between its two ends 26 and 22 (as measured along the middle line of the element 20) than is the interval between the ends 22 and 26. The flexible element 20 thus has a certain excessive length, so that the fitting segment 10 moves out of its position as shown in FIG. 1 or can be deflected out of it, until the wire-shaped element 20 has an essentially straight-lined, extended course and limits a further deflection or movement of the fitting segment 10. The dimensions and the material properties of the thin, wire-shaped element 20 are chosen in such a manner that the flexible element 20 poses so little resistance to its deformation up to the use of its excessive length that the deflection movement of the fitting segment 10 is practically unimpeded by the element 20 by virtue of the forces occurring from the intended use of the spectacles.

The fact that the element 20 still ultimately limits the deflection movement in the final positions of the fitting segment 10 can be exploited by forming the fitting segment 10 and possibly the connecting segment 6 as gentle springs (low elastic constant) and simultaneously guaranteeing that the requisite reaction forces can be absorbed by the fitting segment by the fitting segment's being kept, as, for example, in the position shown in FIG. 1, under a certain pre-stressing directed to the right, as seen in FIG. 1.

As will be noted from the above detailed description and may be seen in the illustrations, the fitting segment 10 is retained and supported essentially at its lower end. From this lower end the remainder of the fitting segment 10 juts upward, whereby while its upper end 18 is connected by means of the flexible element 20 to the first segment 2, this connection nevertheless permits of a limited relative motion between the upper end 18 of the fitting segment 10 on the one hand and the first segment 2 and the connecting segment 6 on the other.

By virtue of the above described configuration the temple end piece has elastic qualities and a certain deflecting pattern under charging. The temple end piece is represented in its uncharged state in FIG. 1 in complete lines. Simultaneously this representation can also serve as the representation of the temple end piece of spectacles worn in place, the fitting segment 10 of which has been brought into the position shown in complete lines in FIG. 1 by virtue of normal charging from being worn in position. The latter cited manner of regarding it is set as a basis in the following. That contact area X has been indicated schematically in hatchings in FIG. 1 in which the fitting segment is in contact with the ear or head when the spectacles are worn in position and no especial forces are acting on the spectacle, but merely the force of their weight. By virtue of the elastic properties of the fitting segment 10 and of the connecting segment 6 the temple end piece can yield when the spectacles are put into position in the requisite degree in such a manner that the fitting segment 10 will fit against the resting surfaces on the head and ear (not shown) and will come to rest without strong pressure points. By virtue of the firm retention of the fitting segment 10 at its lower end, its upper end will be the farthest deflected with the action of a given force on the fitting segment 10, specifically along approximately a circular arch around the second transition region 12. If fairly strong forces occur in the temple (not shown) running essentially in its longitudinal direction and directed to the right as seen in FIG. 1, as can be the case, for example, from abrupt head movements or knocks against the spectacles, the temple end piece will be deformed more sharply. The middle line 28 of the deformed temple end piece is shown for such as instance in FIG. 1, if only for the connecting segment 6, the second transition area 12 and the fitting segment 10 since the first segment 2 and the first transition region 8 for all purposes do not deform.

A tugging force directed to the right as seen in FIG. 1 in the temple (not shown) causes a reaction force exercised by the ear or skull on the temple end piece from the right as seen in FIG. 1, which force is transferred in the contact area. By virtue of this stressing the connecting segment 6 is stretched somewhat, owing to its leaf-spring property. Simultaneously the fitting segment 10, owing to its leaf-spring property, is somewhat stretched and pivots around its lower end in a counter-clockwise direction. By virtue of this the course is produced which is shown for the middle line 28 in FIG. 1. The fitting segment 10 is directed somewhat more steeply, i.e. deviated in the counter-clockwise direction, and shifted to the left as seen in FIG. 1. In turn, the contact area Y is indicated schematically in hatchings for the deflected position of the fitting segment 10, whereby it will be understood that the fitting segment 10 in the deflected position rests with its surfaces and not with its middle line solely shown. By virtue of the described deflection movement and shifting of the fitting segment 10 the contact area Y is situated slightly lower than the contact region X. For both contact areas X and Y the resulting reaction force from the ear or skull on the fitting segment has been drawn in schematically by means of an arrow, specifically as reaction force FO for the spectacles worn in position without any especial charge and as the reaction force FA for the instance of a sharp deflection of the fitting segment 10. From the above explanation and from FIG. 1 it will be seen that the direction of the reaction forces FO and FA differ from one another in that the reaction force FA is directed more downward (or less upward) than is the reaction force FO, i.e. that the direction of the reaction force FA proceeds from a turn in a counter-clockwise direction from the direction of the reaction force FO. The reaction force FA, which seeks to restore the temple end piece and thus the entire spectacles to its original position, thus has essentially the desired strong horizontal power component which seeks to restore the spectacles backward, i.e. to the left as seen in FIG. 1, and in any case a weak vertical power component directed upward. In the instance illustrated the power component of the reaction force FA is even negative, i.e. directed downward, so that the temple end piece under favorable circumstances is pulled downward.

The above described elastic and deflecting pattern of the temple end piece is caused essentially by the geometric relation between the first segment 2, the connecting segment 6 and the fitting segment 10, i.e. by the fact that the fitting segment is retained and supported at its lower end or in its lower region and has a long end region protruding upward. By virtue of this it is essentially predetermined in which manner the fitting segment will be shifted under stressing. This shifting is supported and controlled by a suitable choice of the elastic properties of the three segments of the temple end piece and, if necessary, by the provision of special elastic regions not shown. As far as the elastic and deflecting property of the fitting segment has been described in the foregoing, it will not be impeded by the connection established by means of the flexible element 20 between the upper end 18 and the first segment. During the described deflection movement the position and form of the flexible element 20 will alter in the manner as shown in FIG. 1 by the illustration of the flexible element 20 depicted in complete and broken lines. While the fitting segment 10 is shown out of its uncharged, normally charged position resting against the ear in complete lines and to the left as viewed in FIG. 1, i.e. performs the desired deflection movement, the interval between the two ends 22 and 26 of the flexible element 20 at first is reduced, so that the excessive length of the flexible element increases. With further deflection of the fitting segment 10 to the left as seen in FIG. 1, the interval between the ends 22 and 26 will increase, whereby the excessive length is increasingly used till the flexible element 20 has assumed the position and form shown in a dotted line, in which the entire excessive length is used up and the flexible element 20 is essentially shaped in a straight line. The flexible element 20 poses great resistance to a further movement of the fitting segment 10 to the left. This is true for deflections of the fitting segment 10 in other directions as well: as soon as the interval between the ends 22 and 26 of the flexible element 20 can no longer be enlarged by increasing stretching of the flexible element, the flexible element 20 practically prevents any further deflection, so that it limits the extent of the deflection of the fitting segment 10. In any event it is possible that the extent of the deflection of the fitting segment 10 is limited by other means, as for example, by its resting on the connecting segment before the flexible element 20 can exercise its limiting effect.

As far as the change in form and position of the flexible element 20 solely requires flexing, the flexible element 20 will practically not impede the desired movement of the fitting segment 10, because the pliability and flexibility of the flexible segment 10 is correspondingly high through its choice of shape and material.

The connection established by the flexible element 20 between the upper end 18 of the fitting segment 10 and the first interval 2 has the result that when the spectacles are put into position the fitting segment 10 is guided at its upper end 14 by the first segment 2, so that it is possible by manipulation on the pertinent temple of the spectacle frame to position the fitting segment 10 in the desired manner on the head and/or behind the ear. In any event, this possibility of manipulation is sooner afforded than would be the case if the upper end 18 were freely movable by the element 20 on all sides without limitation. Also when the spectacles are removed, the flexible element 20 guides the fitting segment 10 by preventing undesired additional deflections. In addition, the flexible element 20 forms a bridge between the first segment and the upper end 18, which prevents the end 18 from hooking or getting stuck in the hair like a hooked tip. Finally, provision is made by virtue of the flexible element 20—as will be seen from observing from the side of the temple end piece as shown in FIG. 1—for there to be no space between the upper end 18 of the fitting segment 10 and the first segment 2, through which hair or other objects could otherwise penetrate into the area bordered by the first segment 2, the connecting segment 6 and the fitting segment 10.

In the following the second embodiment will be explained with reference to the FIGS. 5 and 6, whereby the same reference numerals will be used for identical or analagous parts in the preferred embodiment and only the differences to the preferred embodiment essentially will be discussed.

While in the preferred embodiment the first segment 2, the connecting segment 6 and the fitting segment 10 lie essentially in the same plane, as will be seen in the top view according to FIG. 2, in the second embodiment the fitting segment 10 is arched out of the plane defined by the connecting segment 6 and the first segment 2, specifically to the right as seen in FIG. 5. This means that the fitting segment 10 is closer to the head (not shown in FIGS. 5 and 6) than is the first segment 2. By virtue of such a shape of the temple end piece a good fit for this can be achieved to the geometry of the fitting area of the temple end piece on the head and/or ear of the spectacle wearer.

As will be seen in FIG. 5 and 6, in this embodiment the flexible element 20 in the uncharged state of the temple end piece has an essentially stretched, straight-lined course. The temple end piece extends diagonally from its first end 22 forward (to the right as seen in FIG. 6) and laterally (to the right as seen in FIG. 5 and upward in FIG. 6), whereby in FIG. 5 its approximately horizontal course can be seen. By virtue of this geometry and position of the flexible element 20 it poses any movement of the fitting segment 10 in the desired direction of deflection, which is shown in FIG. 6 with a double arrow M, with only a slight resistance, so that this deflection movement is practically unimpeded. On the other hand, it poses a significantly greater resistance to any diagonal motion of the fitting segment 10 in any direction running essentially vertically to the plane defined by the connecting segment 6 and the first segment 2, this direction being shown with a double arrow N; this is because the flexible element 20 would not essentially be bent, but would be compressed or extended with such a movement. Thus the flexible element 20 exercises a stronger guiding effect for the fitting segment 10 in the second embodiment by all but not impeding movements in the desired direction of deflection, but while sharply impeding directions deviating from this. This enhanced guiding effect makes it easier to take off and put on spectacles equipped with this temple end piece.

In the third preferred embodiment according to FIGS. 7 and 8 the fitting segment 10 is composed throughout of the softer material of which the casing 16 consists in the preferred embodiment. Thus the fitting segment 10 of the third embodiment does not have a more rigid and harder core area as is provided for in the preferred embodiment. The second transition region 12 is formed in one piece with the fitting segment 10 and is thus likewise composed of the softer material, which transition region has a short shank 30 on its side made facing the connecting segment 6, which shank is firmly connected to the connecting segment 6 by means of a plug 32 formed on the connecting segment 6. The connecting segment 6 and the first segment 2 consist of a relatively harder, more rigid material. Provision is made by virtue of the configuration of the entire fitting segment 10 and also through the transition region 12 composed of the softer material for the fitting segment 10 to be able to adapt in high degree to the geometry of the fitting area on the head and/or the ear of the spectacle wearer.

The flexible element 20 in the third embodiment has the form of a flat band with an essentially flat, rectangular profile, as seen in enlargement in FIG. 9. This band extends bent in essentially an S-shape between its first and upper end 22 and its second or lower end 26, whereby the first end 22 is situated in the uncharged state of the temple end piece essentially above the second end 26. The larger length of the flat, rectangular profile of the flexible element 20 is situated vertically to the drawing plane of FIG. 7, as the view in accordance with FIG. 8 shows. In this manner the pliability of the flexible element 20 with movements of the fitting segment 10 in the desired direction of deflection, i.e. essentially in the drawing plane of FIG. 7, is very large, by contrast to which it is significantly slighter vertically to this, so that the flexible element 20 similar to the flexible element of the second embodiment according to FIG. 5 and 6 is pliably soft in the desired direction of deflection, but rigid to bending in other directions and in consequence of this hat increased guiding capability.

At its lower end 26 the flexible element 20 is formed in one piece with the fitting segment 10. At its upper end 22 the flexible element 20 is connected to the first segment 2 by virtue of the fact that a surrounding groove 34 has been formed into the latter, into which a thin-walled collar 36 is inserted, which in turn is formed in one piece with the first end 22 of the flexible element 20. Preferably the collar 36, the flexible element 20, the fitting segment 10 and the second transition region 12 will be injection-molded simultaneously on the connecting segment 6 and the first segment 2.

The elastic and deflecting pattern of the temple end piece according to the third embodiment corresponds basically to the elastic and deflecting pattern of the preferred embodiment and for this reason will not be discussed anew. One difference exists solely with respect to the greater rigidity of the flexible element 20 vertical to the drawing plane of FIG. 7 and the laterally effected guide for the fitting segment 10. In the band-shaped flexible element sufficient mechanical firmness can be achieved even with a very slight thickness of this element, so that a film or foil-like configuration of the flexible element 20 is possible with correspondingly around zero resistance to deflection movements of the fitting segment 10 in the desired direction of deflection.

In the following the fourth embodiment will be discussed with reference to FIG. 10, whereby—as with all embodiments—the same reference numerals will be employed for identical or analagous parts in the other embodiments and essentially only the difference to one or several of the embodiments will be discussed.

The temple end piece in accordance with the fourth embodiment consists, as do the previously described embodiments, of two materials, viz. a relatively softer and a relatively firmer material. The use of the softer material goes a step further in the fourth embodiment than in the third embodiment since in the fourth embodiment solely a rod-shaped core region 38 of the second segment 2 and a sickle-shaped core region 40 of the connecting segment 6 are composed of the firmer material. The two core regions 38 and 40 are formed in one piece with the shaft of the temple 42 in the immediate extension of the temple shaft 42 of the corresponding temple. The core region 38 of the first segment 2 is surrounded by a tube-shaped casing 44 of the softer material, which casing transforms into a tube-shaped casing 46, which surrounds the core region 40 of the connecting segment 6. The casing 46 in turn transforms into the second transition area 12, which like the fitting segment 10 is composed exclusively of the softer material. The entire surface of the temple end piece according to FIG. 10 is thus composed of the softer material; solely the first segment 2 and the connecting segment 6 and the core regions 38 and 40 have the harder and firmer material to make the temple end piece rigid and help retain its shape.

The flexible element 20 of the fourth embodiment, composed of the softer material, is formed with its second end 26 on the upper end 18 of the fitting segment 10 and with its first end 22 on the casing 44 of the first segment 2. In the uncharged state of the temple end piece the first end 22 will lie diagonally upward anterior to the second end 26, i.e. to the right as seen in FIG. 10 and above end 26. The flexible element 20 runs in a serpentine or S-shape between its two ends. The flexible element 20 has the form of a wire and a circular profile as in the first embodiment; yet it could also have the band-shape as found in the third embodiment.

The elastic and deflecting pattern of the temple end piece according to FIG. 10 coincides to a large extent with the elastic and deflecting pattern of the third embodiment, whereby the lateral guiding properties of the flexible element 20 will depend on its formation as a band or a wire. By virtue of the fact that—proceeding from the uncharged state of the temple end piece as shown in FIG. 10—the interval between the two ends 22 and 26 upon being deflected can only increase but cannot decrease, any effect of the deflecting pattern from compression of the flexible element 20 is prevented in the fourth embodiment.

The fifth embodiment differs from all the previous embodiments through the fact that all of its elements are made of one and the same material and in one piece. This material is the relatively harder material of the above described embodiments. In this configuration as well a direct formation of the flexible element 20 on the upper end 18 of the fitting segment is possible. In spite of the use of a firmer material for the flexible element 20, its flexibility can be sufficiently high and its resistance to deformation be kept sufficiently low by having its cross-section area and/or its angular impulse be made relatively low and its length relatively large.

In the embodiment according to FIG. 11 the flexible element extends from its lower, second end 26 in the uncharged state of the temple end piece to diagonally upward and back, i.e. to the left and upward as seen in FIG. 11, so that the upper, first end 22 is anchored on the first transition area 8, with which is has been formed in one piece. In the uncharged state the flexible element 20 runs essentially extended in a straight line. The desired deflection movement to the left will nevertheless be possible, because—proceeding from the uncharged state shown in FIG. 11—the interval between the ends 22 and 26 will initially be diminished. The arrangement of the flexible element 20 in accordance with FIG. 11 makes it possible for provision to be made in a simple manner for the pivoting movement of the fitting segment 10 to the left (as seen in FIG. 11) not necessarily to be delimited by the flexible element 20, but by its coming to rest on the connecting segment 6, whereby the flexible element 20 is at least partially protected from being stressed with two strong a force.

FIG. 12 shows a variant in section of the fifth embodiment in accordance with FIG. 11. This variant has as its sole peculiar feature the additional casing 16 on the fitting segment 10, this being composed of the softer material. Different from the first embodiment, however, the flexible element 20 is not formed as an extension and made of the same material the casing 16, but is formed as an extension and out of the same material as the core region 14, which is formed in one piece with the connecting segment 6 and the first segment 2. In the variant according to FIG. 12 the suppleness of the fit of the fitting segment is enhanced by the casing 16 made of the softer material.

The elastic and deflecting pattern of the embodiment in accordance with FIG. 11 and its variant according to FIG. 12 coincide mutually and are essentially the same as in the embodiment according to FIG. 1.

The sixth embodiment in accordance with FIG. 13 largely resembles the fifth embodiment in accordance with FIG. 11 and differs from the latter through the fact that the flexible element is not formed in one piece with the remainder of the temple end piece, but consists of one wire which, initially produced separately from the remainder of the temple end piece, is then attached to it. This connection can be accomplished in such a manner that the two ends 22 and 26 of the element 20 are poured in or injected into the end 18 of the fitting segment 10 and the first segment 2 or the transition region 8 if the temple end piece is essentially manufactured as an injection mold component. Alternatively, the flexible element 20 can also be inserted after the injection of the remainder of the temple end piece and be attached, for example, by means of cement. This configuration in accordance with the sixth embodiment makes it possible for the flexible element 20 to employ a different material from that in the first segment 2 or the transition area 8, which is especially suitable as the material properties of the first segment 2 and/or the transition area 8 are less suitable for the flexible element 20. The flexible element 20 of the sixth element can be composed, for example, of a polyamide (nylon) wire.

The deflection and elastic pattern of the temple end piece in accordance with the sixth embodiment coincides essentially with the deflecting and elastic pattern of the fifth embodiment.

As relatively softer materials within the meaning described above, the following are suited as example: rubber or elastic plastic, among them silicone rubber, thermoplastic polyurethane elastomers, polyether-block-amides, soft-polyvinyl chloride or polyethylene. Suitable as relatively harder materials within the meaning described above are, e.g., the polyetherimides.

It will be understood that numerous variants of the above described embodiments may be undertaken. It is especially possible to provide for any one certain form of the flexible element 20 envisioned for any one embodiment to be also employed in any of the other embodiments in the place of the relevant form envisioned in those other embodiments.

A temple end piece for a temple of a spectacle frame comprises an essentially straight first segment extending in the longitudinal direction of the temple, a connecting segment extending downward from the first segment, and a fitting segment intended for resting against the head and/or behind the ear. The elongated fitting segment is borne by the connecting segment and supported by it, whereby this support is accomplished at the longitudinal middle or on the lower end or in the region between the longitudinal middle and the lower end of the fitting segment, so that at least the upper half of the fitting segment protrudes upward to the first segment and can be deflected elastically in the direction toward the connecting segment. The upper end of the fitting segment is connected to the first segment or the connecting segment with the aid of a flexible, elongated element 20, which element will be sufficiently pliable in order to permit of the deflection movement in sufficient measure, but simultaneously to form a bridge between the upper end of the fitting segment and the first segment and/or connecting segment, so that the upper end can formed no hook-like tip and at the same time no hair or similar objects between the first segment and the fitting segment can reach into the space bordered by the fitting segment and connecting segment.

While in the example of the connection segment 10 shown in FIG. 1 the core 14 is of a much stiffer synthetic material, which practically spreads over the entire length of segment 10, the third embodiment shown in FIG. 10 does not have a hard core and is made from softer synthetic materials. In addition, in the third embodiment shown in FIG. 10 the transition zone 12 is also fabricated out of a softer material.

Other versions, where the core of stiffer material of segment 10 extends to a greater or lesser degree, are also possible.

For example, the core 14 of segment 10 as shown in FIGS. 1–4 can extend to an upper limit 48 from the transition zone 12 which is approximately 5–20% of the total length of segment 10. The dotted line in FIG. 1 indicates the limit 48. A relatively small core 14 has proven expecially practical.

I claim:

1. Temple end piece for a temple of a spectacle frame comprising an essentially straight first segment extending in the longitudinal direction of the temple, an elongated substantially arcuately shaped fitting segment which is intended for resting between the head and the ear and which extends downwardly with respect to the first segment, and a connecting segment extending from the first segment to the fitting segment and connecting these segments to one another, said connecting segment being connected to the fitting segment at or below the longitudinal middle of the latter and whereby at least the upper half of the fitting segment forms an end region protruding out from the transition region between the connecting segment and the fitting segment upward in the direction toward the first segment, which end region is deflectable at least essentially to the rear in the direction toward the connecting segment, and an elongated, flexible element attached at its one end to the upper end of the fitting segment, and attached at its other end to the first segment where by the flexible element permits movement of the upper end of the fitting segment rearwardly relative to the first segment.

2. Temple end piece according to claim 1, characterized by the fact that that the flexible element has an essentially circular cross section.

3. Temple end piece according to claim 1, characterized by the fact that the flexible element has an essentially flat, rectangular cross section.

4. Temple end piece according to any one of claims 1 through 3, characterized by the fact that the flexible element has such a length between its two ends that with the movement permitted by the element the interval between the first and the second end of the flexible element is smaller than its length.

5. Temple end piece according to any one of claims 1 through 3, characterized by the fact that in the uncharged state of the temple end piece the first end of flexible element is situated essentially above the upper end of the fitting segment.

6. Temple end piece according to any one of claims 1 through 3, characterized by the fact that in the uncharged state of the temple end piece the first end of the flexible element is situated essentially diagonally upward behind the upper end of the fitting segment.

7. Temple end piece according to any one of claims 1 through 3, characterized by the fact that in the uncharged state of the temple end piece the first end of the flexible element is situated essentially diagonally upward anterior to the upper end of the fitting segment.

8. Temple end piece according to any one of claims 1 through 3, characterized by the fact that in the uncharged state of the temple end piece the flexible element is curved in an S-shape.

9. Temple end piece according to any one of claims 1 through 3, characterized by the fact that in the uncharged state of the temple end piece the flexible element is essentially straight.

10. Temple end piece according to any one of claims 1 through 3, characterized by the fact that the first segment, the fitting segment and the connecting segment are composed at least in their core regions of the same material and in one piece and that the flexible element is composed of this material on the remainder of the temple end piece.

11. Temple end piece according to claim 10, characterized by the fact that the fitting segment has a casing made of a softer material than that of its core region.

12. Temple end piece according to any one of claims 1 through 3, characterized by the fact that the flexible element is composed of a different material than that of the first segment, the connecting segment and the fitting segment.

13. Temple end piece according to claim 12, whereby the temple end piece is an injection molded component having the two ends of the flexible element poured into the remainder of the temple end piece.

14. Temple end piece according to any one of claims 1 through 3, characterized by the fact that the first segment, the connecting segment and the fitting segment are composed of at least two materials, viz. of a relatively softer and a relatively harder material, whereby the softer material forms at least the outer surface of the fitting segment, and that the flexible element is composed of the softer material on the fitting segment.

* * * * *